US012387860B2

(12) United States Patent
Krenn et al.

(10) Patent No.: US 12,387,860 B2
(45) Date of Patent: Aug. 12, 2025

(54) ELECTRICAL COMPONENT COMPRISING AN ELECTRICAL RESISTOR

(71) Applicant: TDK Electronics AG, Munich (DE)

(72) Inventors: Michael Krenn, Dobl-Zwaring (AT); Hans Prem, Graz (AT); Huinan Xie, Zhuhai (CN)

(73) Assignee: TDK Electronics AG, Munich (DE)

( * ) Notice: Subject to any disclaimer, the term of this patent is extended or adjusted under 35 U.S.C. 154(b) by 298 days.

(21) Appl. No.: 17/996,758

(22) PCT Filed: May 27, 2021

(86) PCT No.: PCT/EP2021/064242

§ 371 (c)(1),
(2) Date: Oct. 20, 2022

(87) PCT Pub. No.: WO2021/239898

PCT Pub. Date: Dec. 2, 2021

(65) Prior Publication Data

US 2023/0260681 A1 Aug. 17, 2023

(30) Foreign Application Priority Data

May 29, 2020 (DE) ......................... 102020114500.4

(51) Int. Cl.
*H01C 1/02* (2006.01)
*H01C 1/01* (2006.01)
*H01C 7/02* (2006.01)

(52) U.S. Cl.
CPC ................. *H01C 1/02* (2013.01); *H01C 1/01* (2013.01); *H01C 7/022* (2013.01)

(58) Field of Classification Search
CPC ...... H01C 1/1406; H01C 1/144; H01C 7/025; H01C 7/022; H01C 17/06533
See application file for complete search history.

(56) References Cited

U.S. PATENT DOCUMENTS

| | | | | |
|---|---|---|---|---|
| 4,889,760 A * | 12/1989 | Kippenberg | ........... H01C 7/102 428/209 |
| 5,219,811 A * | 6/1993 | Enomoto | ............ C04B 35/4684 501/138 |
| 5,963,423 A | 10/1999 | Ikeda | |

(Continued)

FOREIGN PATENT DOCUMENTS

| | | |
|---|---|---|
| CN | 1266269 A | 9/2000 |
| CN | 1426588 A | 6/2003 |

(Continued)

OTHER PUBLICATIONS

Alpha Therm Gmbh, "Ceramic PTC Thermistor: PH Series Heater Application," a Therm, URL:http://www.alphatherm.de/datenblaetter/PTC_Thermistoren/PH_Ceramic_PTC_Thermistor.pdf (abgerufen amFeb. 1, 2021), Feb. 1, 2021, 9 pages.

(Continued)

*Primary Examiner* — Kyung S Lee
(74) *Attorney, Agent, or Firm* — Slater Matsil, LLP

(57) ABSTRACT

In an embodiment an electrical component includes an electrical resistor having a PTC ceramic with a reference temperature exceeding 150° C., wherein, at the reference temperature, a reference resistance is twice an amount of a minimum resistance of the PTC ceramic.

29 Claims, 3 Drawing Sheets

(56) References Cited

U.S. PATENT DOCUMENTS

| | | | | | |
|---|---|---|---|---|---|
| 5,982,253 | A * | 11/1999 | Perrin | B60N 2/976 | 333/182 |
| 6,143,206 | A * | 11/2000 | Handa | H01C 7/027 | 252/511 |
| 6,153,931 | A * | 11/2000 | Niimi | H01C 7/025 | 501/137 |
| 6,359,327 | B1 | 3/2002 | Niimi et al. | | |
| 7,524,337 | B2 * | 4/2009 | Rosc | H01C 7/043 | 338/205 |
| 9,620,266 | B2 * | 4/2017 | Ortner | H01G 4/248 | |
| 2003/0218530 | A1 * | 11/2003 | Yoshinari | H01C 7/027 | 338/22 R |
| 2008/0266047 | A1 * | 10/2008 | Vetter | H01C 3/00 | 29/613 |
| 2010/0207718 | A1 * | 8/2010 | Kahr | H01C 1/022 | 338/22 R |
| 2012/0241990 | A1 | 9/2012 | Steinberger et al. | | |
| 2014/0247107 | A1 * | 9/2014 | Aoto | C04B 35/4682 | 252/519.12 |

FOREIGN PATENT DOCUMENTS

| | | | |
|---|---|---|---|
| DE | 1490659 | C | 1/1972 |
| DE | 19822511 | A1 | 12/1998 |
| EP | 0963963 | A1 | 12/1999 |
| EP | 2077256 | A1 | 7/2009 |
| EP | 2840072 | A1 | 2/2015 |
| WO | 9403909 | A1 | 2/1994 |
| WO | 03019581 | A1 | 3/2003 |

OTHER PUBLICATIONS

General Technical Information, "PTC Thermistors," XP055837991, Retrieved from the Internet: URL: https://www.tdkelectronics. tdk. com/download/531162/d78540dfe0589d2bd90cabef477c90b9/pdf-general-technicalinformation.pdf, Feb. 2012, 12 pages.

* cited by examiner

ELECTRICAL COMPONENT COMPRISING AN ELECTRICAL RESISTOR

This patent application is a national phase filing under section 371 of PCT/EP2021/064242, filed May 27, 2021, which claims the priority of German patent application 102020114500.4, filed May 29, 2020, each of which is incorporated herein by reference in its entirety.

TECHNICAL FIELD

The present invention refers to an electrical component comprising an electrical resistor comprising a PTC (positive temperature coefficient) ceramic.

BACKGROUND

Such an electrical resistor is typically used as a resistor element on printed circuit boards (PCBs).

The capability of an electrical resistor comprising a PTC ceramic to transfer energy depends on its volume, the ceramic's specific thermal capacitance and the ceramic's specific reference temperature.

Therefore, state of the art PTC resistor elements show large volumes, in general.

Because of their large volume and comparatively heavy mass, such PTC resistor elements are inappropriate to be arranged as surface-mounted devices (SMD) on PCBs. Therefore, such resistors are usually mounted by means of through-hole technology (THT).

Therefore, prior art resistors are equipped with solderable pins for connection with the PCB. Fixing these THT devices may require a costly and lengthy soldering process comprising a reflow process and an additional wave soldering process.

SUMMARY

Embodiments provide an improved electrical component comprising an electrical resistor comprising a PTC ceramic, which can be manufactured in a less expensive process.

The electrical component comprises an electrical resistor comprising a PTC ceramic with an increased reference temperature. In particular, the reference temperature exceeds 150° C. The reference temperature is defined as the temperature at which a reference resistance reaches twice the amount of a minimum resistance of the PTC ceramic.

The described reference temperature is also known as Curie temperature.

The described reference temperature of 150° C. can be achieved by using a specific ceramic composition for the PTC ceramic. For example, the PTC ceramic comprises a specific ceramic composition with the formula $Ba_{(1-x-y-z)}Pb_xCa_ySr_zTiO_3$. In this formula, $0.1<x<0.3$, $0<y<0.1$ and $0<z<0.1$ may be fulfilled. In particular, x=0.20, y=0.07 and z=0.06 may be fulfilled. The composition may comprise further dopants. Several phases comprising several composition are possible.

The electrical resistor may be applied as an inrush current limiter (ICL) or as a discharge resistor. In an embodiment, the electrical resistor may be applied as an ICL or discharge resistor for high charging during charging/discharging of high performance accumulator energy.

The capability to transfer energy of a PTC ceramic working as an electrical resistor used for inrush current limiting can be calculated as follows:

$$E=c_{th}*V*(T_{Ref}-T_{Amb})$$

Herein, E is the energy transfer capability of the PTC ceramic, Ct is the specific thermal capacitance of the PTC ceramic, V is the volume of the PTC ceramic, $T_{Ref}$ is the reference temperature of the PTC ceramic, and $T_{Amb}$ is the ambient temperature.

Due to the PTC ceramic's comparatively increased reference temperature the resistor is able to transfer a higher amount of energy at the same ambient temperature.

In an embodiment, the PTC ceramic comprises a mixture of ceramic materials showing positive temperature coefficients (PTC) and being therefore typically used as PTC ceramics.

In an embodiment, the reference temperature (Curie temperature) of the PTC ceramic exceeds 165° C.

Due to its high reference temperature the PTC ceramic is able to transfer a high amount of energy at the same ambient temperature.

At a reference temperature of about 165° C. or more an appropriate high energy transfer in the electrical resistor can be achieved, even at high ambient temperatures in the range of 105° C. to 125° C.

This temperature range is typical for operating temperatures in automotive applications.

Possible applications are for example inrush current limiters or discharge resistors of onboard battery chargers (OBC) of electrical driven vehicles or applications concerning solar systems.

The use in the described automotive applications becomes more and more important with the increasing importance of e-mobility.

On the other hand, the volume of an electrical resistor designed to transfer a specified amount of energy can be decreased with a rising reference temperature. Therefore, based on the disclosed PTC ceramic a smaller and more compact electrical resistor can be designed.

In an embodiment, the dimensions and the material of the electrical resistor are selected to provide an optimized trade-off between dielectric strength and current carrying capacity.

In general, a broader dimension of the resistor along a current path leads to a higher dielectric strength, whereas a smaller dimension of the resistor along a current path leads at constant volume to a higher current carrying capacity. The disclosed high reference temperature allows the design of an electrical resistor with an optimized trade-off between these two properties.

Due to the resistor's smaller volume and advantageous geometry, also the mass of the electrical resistor and the electrical component decreases. Such an improved electrical component, showing a smaller volume and a smaller mass in comparison to similar state of the art electrical components, is appropriate to be mounted on a printed circuit board (PCB) by means of the surface-mounting technology (SMT).

In addition, a small mass m increases the vibration resistance of the electrical components, since a force "F" applied on the component during acceleration or deceleration "a" is reduced (F~m*a). In the automotive sector in particular, improving vibration resistance is a decisive factor in meeting customer specification requirements.

Therefore the electrical component comprising the electrical resistor does not require any pins, wires or similar components to fix the device on the PCB anymore. This allows the design of even smaller electrical components which can easily be mounted on the PCB by means of SMT. No special through-holes in the PCB are necessary for the mounting process.

Furthermore, no wave soldering process is required to fix the SMD on the PCB. Using only SMT technology to mount electrical components on a PCB, the effective and comparatively cheap reflow soldering process can be applied to solder the electrical components on one side of the PCB. The additional wave soldering process usually required during the through-hole-technology (THT)-process needs no longer to be applied.

Thus, the disclosed electrical component can be mounted on the PCB in a faster and more efficient way.

Furthermore, the demand for resistors with small volume and small component height for numerous automotive and industrial applications is increasing. Especially due to the high accelerations in the automotive sector, smaller and thus lighter resistors are desired. Smaller resistors also enable a higher application density.

In an embodiment, the electrical resistor has a cuboid shape. In particular, in one embodiment, the electrical resistor has a cubical shape.

In an embodiment the dimensions of the electrical resistor do not exceed 11×5×9 mm and preferably do not exceed 10×5×8 mm.

The thickness of the electrical resistor which is the dimension of the electrical resistor along a current path does not exceed 5 mm. On the other hand, the thickness of the electrical is larger than or equal to 3 mm.

In particular, the height of the resistor shall not exceed 11 mm. The height is defined as the dimension of the resistor perpendicular to the PCB surface. The small height of the component supports tight stacking of PCBs in several applications. In embodiments the height of the resistor does not exceed 10 mm or does not exceed 9 mm.

In embodiments, the height of the resistor is larger than 2 mm or larger than 5 mm or larger than 6 mm.

In one embodiment the height of the resistor amounts 10 mm.

The length of the resistor which is the dimension of the resistor orthogonal to the thickness and the height of the resistor amounts between 2 and 9 mm, whereby the limits are included. In an embodiment the height of the resistor amounts 8 mm or less.

The low height with constant energy transfer is achieved by the following design combination of the electric resistor.

Firstly, the resistor has a cubic shape for maximum volume utilization of the resistor in a cubic housing. In particular, by using a cube-shaped resistor, at least 25% of a cavity in a housing can be utilized by the cube-shaped resistor. A high volume of the resistor contributes to a high energy transfer.

Further, as the resistor comprises the PTC ceramic having a reference temperature of more than 150° C., the high reference temperature additionally contributes to the desired low height and high energy transfer.

In another embodiment, the electrical resistor has a cubical shape and the dimensions of the electrical resistor do not exceed 10×10×10 mm.

The cuboid or the cubical shape may not have rounded corners or edges.

By using a cubical shape, the volume of the resistor, which is usually covered by a cubical housing, can be maximized at given dimensions of the housing.

Thus, an optimized trade-off between dielectric strength and current carrying capacity can be achieved more easily.

Further, an electrical component comprising the resistor with the disclosed dimensions is optimized to be mounted on a printed circuit board (PCB) by means of the surface-mounting technology (SMT).

In an embodiment, the thickness of the electrical resistor which is the dimension of the electrical resistor along a current path does not exceed 5 mm. This dimension guarantees the required current carrying capacity of a ceramic with a reference temperature of at least 150° C. and with an optimized shape and volume. By enhancing the reference temperature or the other dimensions of the resistor perpendicular to the thickness (height and length) the thickness of the resistor can be further reduced.

On the other hand, the dimension of the electrical resistor along a current path is larger than or equal to 3 mm. This dimension guarantees the required dielectric strength. The described resistor with a thickness of at least 3 mm can be loaded with a voltage of at least up to 1000 V or preferred up to 1200 V or more preferred up to 1400 V.

This minimum dimension is also required in consideration of necessary creepage distances for thermistors (c.f. DIN 60738-1).

Thus, said range of dimensions provides an optimized trade-off between dielectric strength and current carrying capacity.

In an embodiment, the electrical component is adapted to be used in applications with a voltage level of up to 1000 V.

In another embodiment, the electrical component is adapted to be used in applications with a voltage level of up to 1200 V.

Due to its appropriate geometrical design and improved thermal properties the ceramic electrical resistor can bare an operating voltage of up to 1200 V. In an embodiment the electrical resistor can bare an operating voltage of up to 1000 V.

Thus, the electrical component is appropriate for usage in high voltage applications as for example in automotive devices or solar systems.

Thereby, the volume has not to be increased beyond the disclosed dimensions. Thus, surface-mounting of high voltage resistors is possible.

In an embodiment, the electrical component further comprises a housing enclosing said electrical resistor.

The housing protects the electrical resistor against outer mechanical impact or damage.

Furthermore, the housing provides a plane surface to mechanically fix and electrically contact the electrical component.

The housing shows a standardized geometrical shape appropriate for mass manufacturing processes. The standardized shape with at least one smooth, plane surface allows a smooth arrangement of the electrical component on a circuit board.

Furthermore, the housing thermally insulates the resistor. Ambient devices are protected from the ceramic resistor, for example when it heats up due to fault current stress. Due to fault current stress the ceramic material of the resistor can heat up to more than 200° C. to 230° C.

Additionally the housing electrically isolates the electrical resistor.

The housing may comprise a thermo-resistant polymer material.

In an embodiment, the housing comprises polymer material. In one embodiment, the housing comprises a cured liquid crystal polymer. In another embodiment, the housing comprises a polyethylene terephthalate (PET) or polypropylene terephthalate (PPT) material mixed with up to 30% of glass fiber material to improve the resistance and robustness of the housing.

In particular, the housing comprising the before mentioned material shows high strength and high robustness against thermal stress. This is advantageous in the event of an application error of the resistor, as the surface temperature of the PTC ceramic can then rise sharply due to fault current stress.

In particular due to the small volume of the electrical resistor and the high reference temperature of the material of the resistor, the surface temperature can rise more sharply than in conventional resistor components.

Thus, a thermally high robust housing allows the design of smaller resistor components.

In an embodiment, the housing is manufactured by injection molding.

In an embodiment, the housing has a compact, cuboid or cubic shape.

This shape fits the compact, cuboid shape of the resistor comprising PTC ceramic.

In particular, by using a cube-shaped resistor, at least 25% of a cavity in the cuboid housing can be utilized by the cube-shaped resistor.

A compact, cuboid shape shows plane, smooth surfaces which are appropriate for standardized mass manufacturing process.

Furthermore, the smooth surface facilitates the mechanical mounting and electrical contacting process of the electrical component on a circuit board.

Additionally, the cuboid, compact shape allows further minimization of the volume of the electronical device.

In an embodiment the dimensions of the housing do not exceed 14×10×12 mm. Thus, the wall thickness of the housing does not exceed 2 mm. For example, the dimensions of the housing amount 13.5×10×11 mm. In an embodiment, the dimensions of the housing do not exceed 12×8×10 mm and the wall thickness of the housing does not exceed 1 mm. In a preferred embodiment, the height of the housing perpendicular to the PCB surface does not exceed 10 mm.

Due to the small volume and an appropriate height, an electrical component with said dimensions can easily be surface-mounted on a PCB. Mounting by means of the through-hole-technology is not necessary.

Further, by reducing the dimensions of the electrical component a higher density of the components can be achieved.

In an embodiment, the electrical component does not exceed a mass of 7 g. In a preferred embodiment, the electrical component does not exceed a mass of 6 g.

The comparatively small volume, compact geometrical shape and an appropriate material of the resistor allow such a low mass.

Due to its small mass, the electrical component can easily be surface-mounted on a PCB in a mass manufacturing process.

In an embodiment, the housing comprises a bottom and a cover. The bottom and the cover form the housing enclosing the electrical resistor in a cavity.

During manufacturing, first the bottom is provided. The resistor comprising the PTC ceramic is arranged on the bottom and the whole structure is pressed together. After that, the cover is arranged on the bottom in such a way that bottom and cover both enclose the electrical resistor in a cavity.

After that, the whole device is pressed together.

In an embodiment, bottom and cover are fixed together by a snap lock. On each side of the cuboid housing a separate snap lock can be provided.

In an embodiment, the electrical component further comprises contact springs which are permanently incorporated in the housing and which comprise at least an inner portion inside the housing in the cavity and an outer portion outside the housing.

The springs may be made of metal.

The springs protrude into the cavity enclosed by the housing and fit closely on two sides of the electrical resistor in order to electrically contact it.

In an embodiment, the contact springs comprise stainless steel.

By using steel contacts with a comparably poor thermal conductivity, the applied conductor path on the PCB can be protected from high surface temperatures of the resistor.

In particular, as described before, due to the small volume of the electrical resistor and the high reference temperature of the material of the resistor, the surface temperature can rise more sharply than in conventional resistor components.

Thus, using steel contacts with a comparably poor thermal conductivity allows the design of smaller resistor components.

In a further embodiment, the contact springs are incorporated in the bottom of the housing. Therefore, the springs can be inserted into the non-cured housing material during injection molding.

In this embodiment, the springs are a fixed, non-interchangeable part of the housing comprising a central portion incorporated by the housing, in particular the bottom.

The springs may further comprise the inner portion in the cavity and the outer portion outside the housing.

The springs may comprise stainless steel having a poor thermal conductivity.

In an embodiment, the contact springs electrically contact the electrical resistor inside the cavity of the housing from at least two opposite sides at contact areas and electrically connect the electrical resistor with an electric contact outside the housing.

In such a way, the contact springs electrically contact the electrical resistor enclosed in the cavity with an electric contact outside of the housing, like for example a contact pad of a conductor path on a PCB.

The contact springs may comprise or consist of steel, preferably stainless steel.

By using (stainless) steel contacts with a poor thermal conductivity, the applied conductor path on the PCB can be protected from high surface temperatures of the electrical resistor. In particular, the surface temperature of the conductor path must not exceed 100° C. in order to avoid defects. Thus, contacts with poor thermal conductivity become mandatory to protect the PCB in error cases when the resistor overheats.

In an embodiment, two springs are provided on each of the two sides of the electrical resistor. By using more springs a reliable electrical contact can be guaranteed.

In an embodiment, the inner portions of the contact springs are arranged to contact and fix the electrical resistor within the housing from at least two opposite sides thereby fixing it inside the cavity of the housing.

In this embodiment, the springs show two functions: Contacting the electrical resistor electrically and fixing it inside in the cavity. By this two functions of the springs, the volume of the device can be further decreased.

In this embodiment, the inner portions of the contact springs which are applied on the resistor are shaped like a barb. The barb shape allows the contact springs to work as a spring. A central, curved part of a barbed shaped portion of the contact spring applies on the resistor, whereas the inner terminus of the spring applies on an inner wall of the cover of the housing. The barb shape of the springs allows a self-locking function. After assembly, the barbs of at least two springs on opposite sides of the resistor are clamped between the resistor and the cover of the housing applying a hard force to the housing to keep the cover closed and to fix the resistor in between.

Advantageously, the described assembly increases the vibration resistance of the electrical component due to the stronger connection between the housing and the resistor.

By using four or more springs a more reliable fixation of the resistor inside the cavity can be guaranteed.

In an embodiment, the electrical component is surface-mounted on a printed circuit board.

On a surface of a printed circuit board several electronic and electrical components are mounted.

The part of the housing arranged on the PCB is designated as bottom. The distant part of the housing is designated as cover. The dimension of the electronic device normal to the PCB surface is designated as the height of the electronic device.

In an embodiment, the electrical component is surface mounted on the PCB by solder.

The dimension of the resistor in a height direction perpendicular to the printed circuit board may be smaller than or equal to 11 mm or smaller or equal to 10 mm.

The dimension of the electrical component including the housing in a height direction perpendicular to the printed circuit board may be smaller than or equal to 14 mm and preferably smaller than or equal to 12 mm or smaller or equal to 10 mm.

The surface-mounted electrical component is mechanically fixed and electrically contacted to the PCB by solder between the bottom of the housing and the PCB surface.

No pins or wires are necessary to fix or contact the electrical components to the PCB surface. Thus, no through-holes in the PCB are necessary. A simplified reflow soldering process can be applied instead of a wave soldering process in order to mount the electrical components on the PCB.

In the reflow soldering process several separate solder pads comprising a solder paste are applied on the PCB surface, e.g. by printing. In a following step, the devices are picked from a tape and placed on the solder pads and are fixed by smoothly re-melting the solder pads for a short time, e.g. by IR-radiation.

Their standardized and compact shape allows a smooth automatized pick-and-place-process.

In case of the embodiment in which the dimensions of the housing do not exceed 14×10×12 mm or preferably 13.5×10×11 mm the automatized pick-and-place-process can be simplified by providing the electrical components on a standard blister tape.

The standard blister tape may have a width of 24 mm.

The maximum temperature during the manufacturing process amounts about 260° C. This temperature is reached for a very short time period. The housing, thermally insulating the resistor comprising the PTC ceramic protects the resistor from thermal stress during the manufacturing process.

In comparison to the described reflow soldering process a conventional wave soldering process, necessary for fixing through-hole-devices (THD), comprises several more steps and is therefore more costly and less efficient.

Furthermore, the electrical components are exposed to a comparatively higher thermal stress during the wave soldering process.

In an embodiment, the outer portions of the contact springs comprise contact pads mounted on an outer side of the bottom of the housing for electrically contacting the contact springs and thus the electrical resistor with the PCB and for mechanically fixing the contact springs and thus the housing to the PCB.

To electrically contact the electrical resistor at least two contact springs are necessary. By providing at least four contact springs a more reliable electrical contact and mechanical fixation of the housing on the PCB can be achieved.

In one embodiment, two contact springs each arranged at the same side of the PTC resistor form a coherent component, which simplifies the manufacturing process of the electrical component. For this purpose, two contact springs each, comprising two contact pads and contacting the PTC resistor at two contact areas, are made from one metal piece and are not completely separated.

In this embodiment the resistor may have 2×2 contact springs with four contact pads. Two contact springs are attached to each of two opposite sides of the PTC resistor. The two contact springs on the same side are connected.

The contact pads may be arranged at the bottom side of the housing facing the PCB. The contact pads form a flat surface together with the bottom surface of the housing.

In an embodiment, all contact pads are arranged coplanar.

In an embodiment, each contact pad is arranged in another corner of the rectangular bottom surface of the housing.

Planar, large-size contact pads for contacting the electrical component and the PCB increase the vibration resistance of the component due to the stronger connection between the electrical component and the PCB. In the automotive sector in particular, improving vibration resistance is a decisive factor in meeting qualification requirements.

In addition to the flat contacting, the already described reduced mass (due to the reduced volume) and the design of the contacts as springs also contribute to the vibration resistance of the electrical component.

The invention further comprises an electrical circuit comprising the electrical component.

In an embodiment, the electrical component is applied as an inrush current limiter (ICL).

An inrush current limiter is a component used to limit inrush current to avoid gradual damage to electrical components and avoid blowing fuses or tripping circuit breakers. Thus, an ICL functions similarly to a resistor limiting the inrush current, and also functions similarly to a resettable fuse in the event of a failure.

In another embodiment, the electrical component is applied as a discharge resistor in an electrical circuit.

A discharge resistor (DCR) is a resistor connected in parallel with the output of a high-voltage power supply circuit for the purpose of discharging the electrical charge stored in the power supply's capacitors when the equipment is turned off, for safety reasons.

BRIEF DESCRIPTION OF THE DRAWINGS

In the following, the invention will be explained in more detail with reference to accompanied figures.

Similar or apparently identical elements in the figures are marked with the same reference signs. The figures and the proportions in the figures are not scalable.

The figures show:

FIG. 1 shows a first embodiment of the electrical component in a cross-sectional view;

FIG. 2 shows the first embodiment of the electrical component in a perspective view from the top;

FIG. 3 shows a first embodiment of the electrical component in a perspective view from the bottom;

FIG. 4 shows a resistance-to-temperature-profile of the PTC ceramic included in the resistor according to the first embodiment used for high-voltage applications (≥800 V DC);

FIG. 5 shows a resistance-to-temperature-profile of the PTC ceramic included in the resistor according to a second embodiment used for low-voltage applications (230 V AC);

FIG. 6 shows electrical components according to the first embodiment mounted on a PCB; and FIG. 7 shows a circuit diagram of an exemplary circuit comprising electrical components according to the first embodiment.

DETAILED DESCRIPTION OF ILLUSTRATIVE EMBODIMENTS

Figure 1:
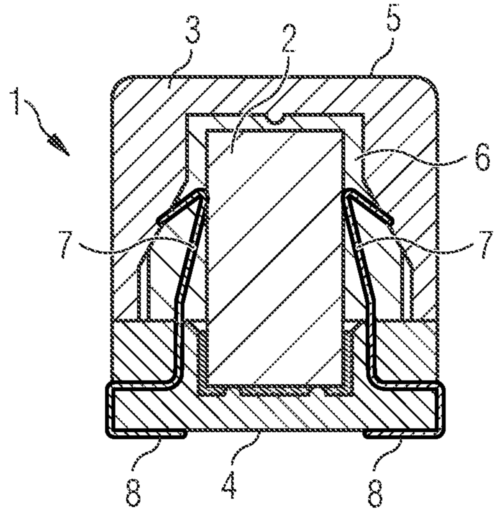
Figure 2:
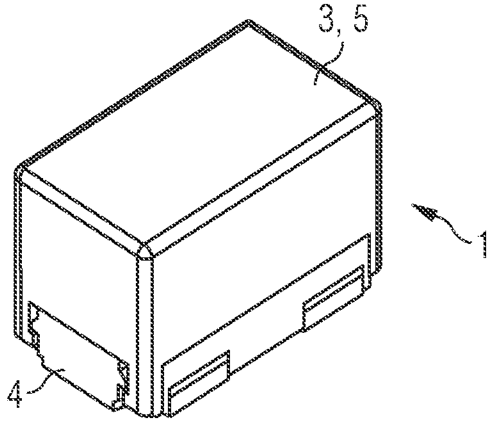
Figure 3:
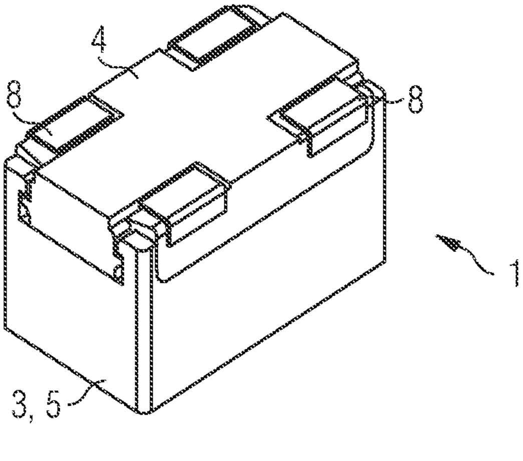

The FIGS. 1, 2 and 3 show an embodiment of the electrical component 1 according to the invention from different views. The electrical component 1 comprises an electrical resistor 2. The electrical resistor consists of a ceramic with a positive temperature coefficient (PTC).

The electrical resistor 2 has a cuboid shape. The dimensions of the electrical resistor are selected to optimize the dielectric strength and the current carrying capacity of the resistor.

The cuboid resistor 2 has three dimensions. In the first embodiment electric current can pass the resistor from a first side to a second side. The distance between these two sides is estimated as the width of the resistor. Therefore, the width of the resistor corresponds to the length of the current path through the resistor.

The dimensions normal to the width are designated as the height and the length of the resistor.

In the present embodiment the dimensions of the resistor 2 amount 4.2 mm in width, 10.2 mm in height and 8.1 mm in length.

The ceramic material of the electrical resistor comprises a mixture of different ceramic materials which are typically used in electrical resistors and have PTC properties.

Figure 4:
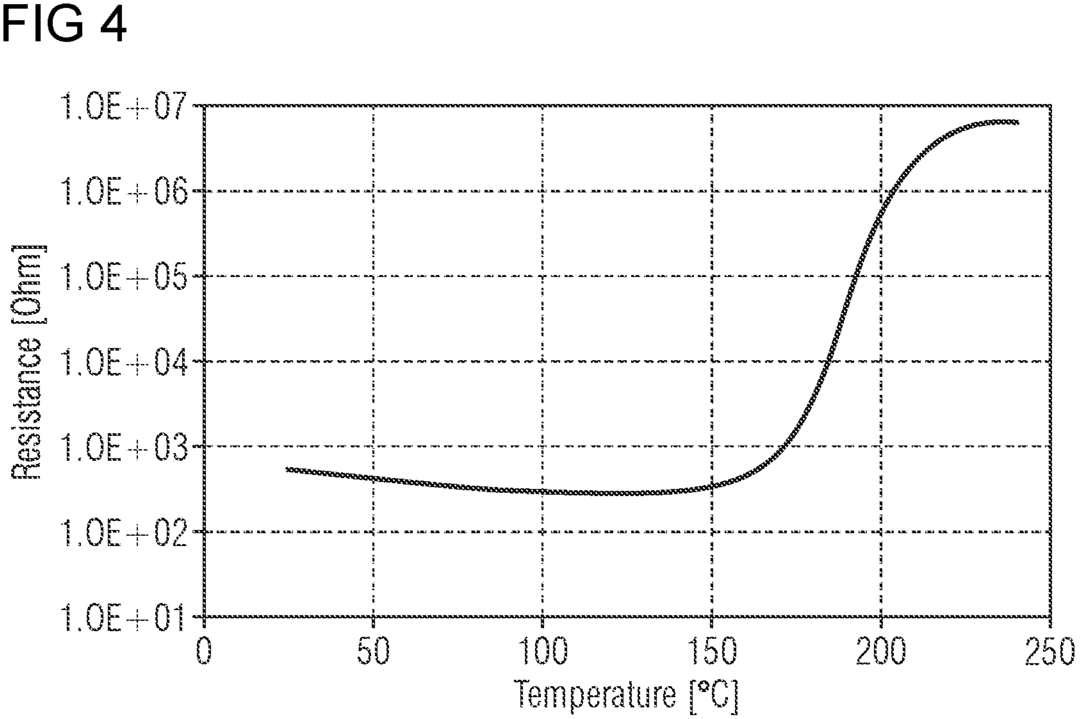
Figure 5:
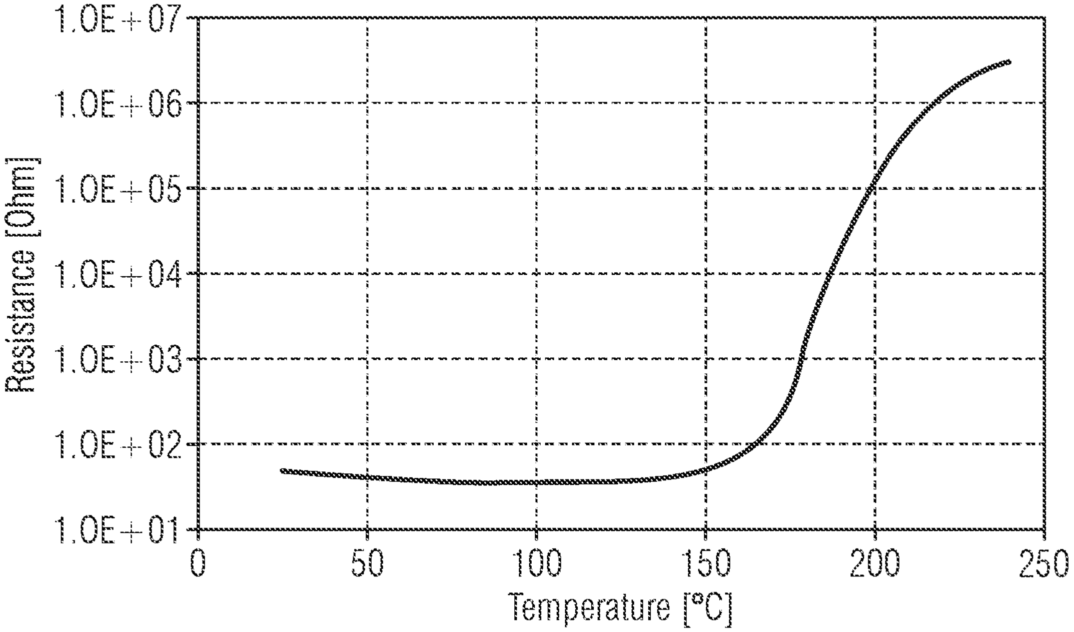

These ceramic materials are mixed with different ratios in order to obtain a PTC ceramic with a resistance-to-temperature-profile as shown in the FIGS. 4 and 5.

In the first embodiment, the PTC ceramic's composition is optimized to be applied in high voltage applications ≥800 V DC (direct current).

The PTC ceramic is characterized by a resistance-to-temperature-profile according to FIG. 4. The profile is measured at low-level-voltage (1V, pulse signal).

The reference temperature of the PTC ceramic amounts as shown in FIG. 4 around 165° C.

The ability of a PTC ceramic resistor applied as an inrush current limiter or a discharge resistor in an electric circuit to transfer energy is calculated by the following formula:

$$E=c_{th}*V*(T_{Ref}-T_{Amb})$$

Due to the ceramic's high reference temperature, the volume and thus the mass of the resistor can be minimized.

In comparison to a conventional PTC ceramic resistor the volume of the electrical resistor can be reduced by approximately 60%.

The high reference temperature further allows a variation of the dimensions in order to optimize the properties of the resistor 2 regarding its current carrying capability and dielectric strength.

The described electrical resistor 2, comprising the described ceramic material and having a width of 4.2 mm, shows an optimized trade-off between an improved current carrying capability and an improved dielectric strength.

The high reference temperature further allows a variation of the dimensions in order to optimize the properties of the resistor regarding its current carrying capability and dielectric strength.

Therefore, the electrical resistor is adapted to be used in high voltage applications with a voltage level of up to 1000 V.

Nevertheless, the same electrical resistor can be used in applications with a lower voltage level.

In a second embodiment the PTC ceramic's composition is optimized to be applied in a lower voltage applications (230 V AC (alternating current)).

The PTC ceramic of the second embodiment is characterized by a resistance-to-temperature-profile according to FIG. 5. The profile is measured at low-level-voltage (1V, pulse signal). All other properties of the resistor are the same as in the first embodiment.

As can be seen in FIG. 5, the resistance of the electrical resistor in the working range below 165° C. is lower at the same temperature than in high-voltage applications.

In this case, the volume of the resistor can be even more decreased or the transmitted electrical energy can be increased.

The electrical resistor 2 is enclosed by a housing 3. The housing 3 comprises a bottom part and a cover part arranged along the height of the resistor 2. The bottom 4 encloses a lower portion of the resistor 2 and the cover 5 encloses an upper portion of the resistor 2.

The dimensions of the housing do not exceed 14×10×12 mm. The wall thickness of the housing does not exceed 2 mm. For example, the housing has a height of 13.5 mm, a length of 10 mm and a width of 11 mm.

The both parts of the housing 3 are connected by snap locks applied on each side of the housing 3.

The outer side of the housing 3 shows a cuboid shape adapted to the shape of the resistor 2. In the inside, the housing 3 provides a cavity 6 in which the resistor 2 is embedded.

During the assembling process, first the bottom 4 of the housing 3 is provided. The resistor 2 is arranged in a recess in the bottom 4 provided for this purpose.

Furthermore, the housing 3 comprises four metallic contact springs 7 incorporated in the bottom 4. These metal springs 7 press on the resistor 2 from two opposite sides at four contact areas, two at each side. Thereby the springs 7 get stretched and fix the resistor 2 in the cavity 6 inside the housing 3.

Two springs, each arranged at the same side, hang together and are cut from one metal piece.

By using four springs 7 the mechanical fixation and the electrical connection of the resistor 2 is improved.

In a further step, the cover 5 is arranged on the bottom 4 in order to form the housing 3 and the cavity 6 enclosed by the housing 3 and accommodating the resistor 2.

The both parts of the housing 3 are injection molded.

The metal springs 7 are incorporated into the bottom 3 during the injection molding process.

The housing 3 of the present embodiment consists of a polymer material. For example, the housing 3 consists of a liquid-crystal polymer material showing high strength and high robustness against thermal stress.

In another example, the housing 3 consists of PET or PPT mixed with up to 30 wt % of glass fiber material. The glass fiber material gives the material of the housing 3 high strength and high robustness against thermal stress.

The housing 3 protects the electrical resistor 2 against damaging mechanical impacts. Furthermore, it insulates the resistor 2 thermally. The thermal insulation protects ambient devices if the resistor 2 heats up.

In addition, the outside of the housing 3 offers a smooth and even surface that allows the housing 3 to be easily mounted on a carrier such as a printed circuit board.

Standardized dimensions of the housing 3 allow a mass assembly process of the electrical component 1 according to the described embodiment on a PCB.

The metal springs 7 comprise inner portions contacting and fixing the resistor 2 comprising the PTC ceramic in the cavity 6 of the housing 3.

Furthermore, the metal springs 7 also comprise outer portions exposed at the outside of the housing 3 comprising contact pads 8.

The springs 7 protrude from the housing 3 on a side surface normal to the bottom side. The outer portion of the springs 7 is tightly attached to the outer surface of the housing 3.

The contact pads 8 are portions of the springs 7 tightly attached to the bottom side of the bottom 4. The bottom side is the outer side of the of the housing's bottom 4 opposite to the cover 5.

In the shown first embodiment, the contact pads 8 are arranged in the four corners of the rectangular bottom side.

The dimensions of the bottom side are defined as the width and the length of the resistor 2. The dimension normal to the bottom side is designated as the height of the resistor 2.

Figure 6:
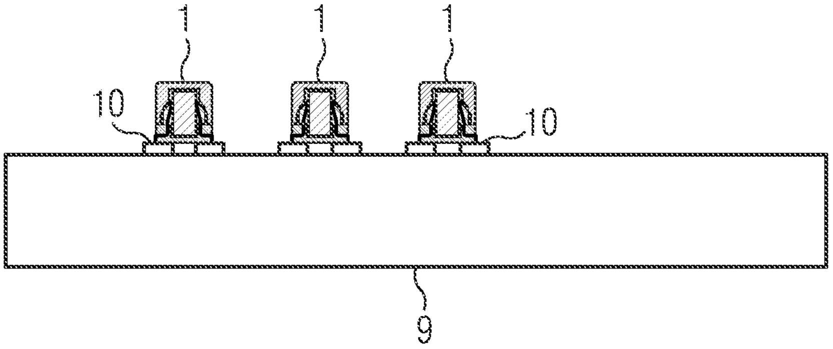

These contact pads 8 can be fixed on the printed circuit board (PCB) 9 as shown in FIG. 6.

When providing four springs 7 with in total four contact pads 8, a reliable fixation of the electrical component 1 on the PCB 9 can be accomplished.

The metallic contact pads 8 are fixed on solder pads 10 on the PCB 9. The solder pads 10 are attached on electrical contact points of the PCB 9. Therefore, the device 1 is electrically contacted with a circuit on the PCB 9. Providing four contact pads 8 and four solder pads 10, a reliable contact between the PCB 9 and the device 1 can be accomplished.

In this way, the electrical component 1 can be incorporated in an electrical circuit printed on the PCB 9.

Figure 7:
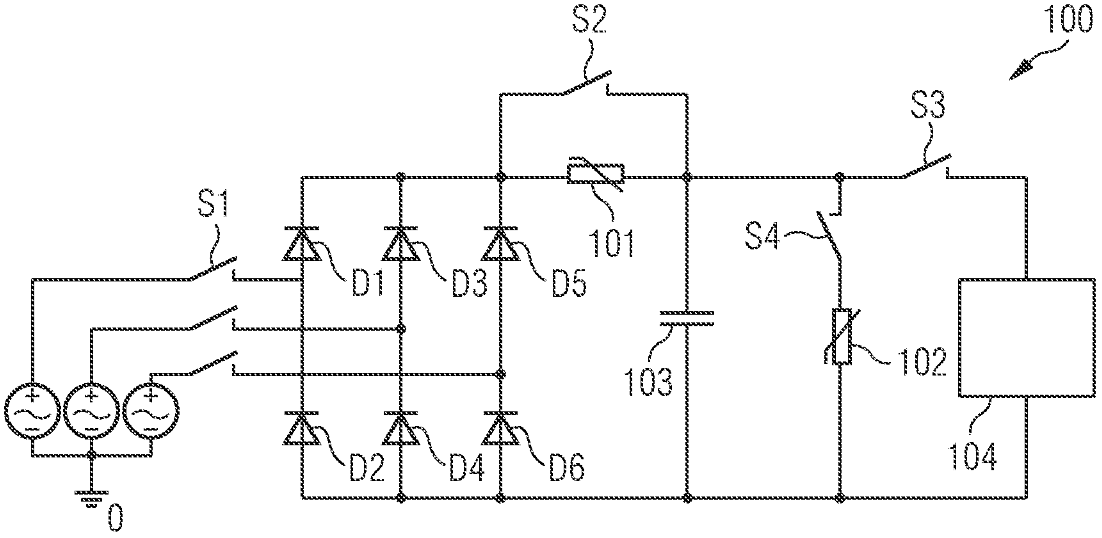

The circuit diagram in FIG. 7 shows two examples for applications of the electrical component 1 according to the invention incorporated in an electrical circuit.

The two electrical components ICL 101 and DCR 102 are incorporated in the circuit of an automotive onboard battery charger (OBC) 100 as shown in the circuit diagram.

The devices 1 comprising a PTC ceramic material according to the invention serve as electrical resistors in the circuit.

A device 1 designated as ICL 101 is applied as an inrush current limiter, whereas another device 1 designated as DCR 102 is applied as a discharge resistor.

For charging a capacitor 103 the three shown switches S2, S3 and S4 are open and a 3-phase switch S1 (main switch) is closed. The inrush current limiter ICL 101 limits the inrush current peak of a charging current to a level which does not damage the diodes D1 to D6 incorporated in the circuit and does not blow fuses at the power distribution of the electrical grid.

The ICL 101 has to transfer the charging energy $E_c$ of the capacitor 103.

The charging energy $E_c$ is given by $$E_c = \frac{C * U^2}{2}$$

wherein U is the voltage level to which the capacitor 103 is charged and C is the capacity of the capacitor 103.

In order that the temperature of the PTC ceramic $T_{PTC}$ does not rise too much and the PTC ceramic does not change to a high-resistance state ($T_{PTC}<T_{Ref}$) $E \geq 0.96*E_c$ must be fulfilled, wherein $0.96*E_c$ corresponds to the energy level at the ICL 101.

Once the capacitor 103 is charged to the voltage level U, the ICL 101 is short-circuited by closing the switch S2. To integrate the electrical load 104 in the circuit the switch S3 (load switch) is closed.

In case of a malfunction of the circuit (e.g. short-circuit of terminals of the capacitor 103 or the switch S2 does not close) a fault current occurs. The resulting high electrical power heats-up the ICL 101. Therefore, the ICL 101 becomes high-resistant and reduces the fault current to a low value.

For discharging the capacitor 103 the switches S1 and S3 are opened, whereas the switch S2 remains closed and the switch S4 is additionally closed. The energy stored in the capacitor 103 ($E_c$ according to the formula above) is then discharged over the DCR 102. The DCR 102 working as a discharge resistor converts the electrical energy of the capacitor 103 into heat energy.

In order that the DCR 102 is not heated up above its reference temperature it has to fulfill $E \geq E_c$.

In case of a malfunction of the circuit (e.g. S1 is not opened) the supply voltage from the grid would be connected directly to the discharge resistor DCR 102 causing a high thermal load on the resistor. In this case, the DCR 102 is heated up and decreases the fault current by its high resistance. In this case, the resistor DCR 102 works as a fuse.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. An electrical component comprising:

an electrical resistor comprising a PTC ceramic with a reference temperature exceeding 150° C., wherein, at the reference temperature, a reference resistance is twice an amount of a minimum resistance of the PTC ceramic, wherein the electrical resistor has a cuboid shape, wherein a dimension of the electrical resistor along a current path does not exceed 5 mm, and wherein the dimension of the electrical resistor along the current path is larger than or equal to 3 mm.

2. The electrical component of claim 1, wherein the reference temperature exceeds 165° C.

3. The electrical component of claim 1, wherein dimensions and materials of the electrical resistor are selected to provide an optimized trade-off between dielectric strength and current carrying capacity.

4. The electrical component of claim 1, wherein dimensions of the electrical resistor do not exceed 11×5×9 mm.

5. The electrical component of claim 1, wherein the electrical component is adapted to be used in applications with a voltage level of up to 1400 V.

6. The electrical component of claim 1, further comprising a housing enclosing the electrical resistor.

7. The electrical component of claim 6, wherein the housing comprises a thermo-resistant plastic material.

8. The electrical component of claim 6, wherein the housing has a compact, cuboid shape.

9. The electrical component of claim 6, wherein a mass of the electrical component does not exceed 7 g.

10. The electrical component of claim 6, wherein the housing comprises a bottom and a cover both enclosing the electrical resistor in a cavity.

11. The electrical component of claim 6, further comprising contact springs permanently incorporated in the housing and comprising at least an inner portion inside the housing in a cavity and an outer portion outside the housing.

12. The electrical component of claim 11, wherein the inner portions of the contact springs, which are located on the resistor, comprise central, barb shaped portions, wherein an inner terminus of each spring is arranged on an inner wall of a cover of the housing, wherein the barb shaped portions of the contact springs on opposite sides of the resistor are clamped between the resistor and the cover, and wherein the cover provides a hard force to keep the housing closed and to fix the resistor.

13. The electrical component of claim 11, wherein the contact springs are a fixed, non-interchangeable part of the housing comprising a central portion incorporated by a bottom of the housing.

14. The electrical component of claim 11, wherein the contact springs comprise stainless steel.

15. The electrical component of claim 11, wherein the contact springs electrically contact the electrical resistor inside the cavity in the housing from at least two opposite sides at contact areas and electrically connect the electrical resistor with an electric contact outside the housing.

16. The electrical component of claim 11, wherein the inner portions of the contact springs are arranged to contact and fix the electrical resistor within the housing from at least two opposite sides thereby fixing it inside the cavity of the housing.

17. The electrical component of claim 1, wherein the electrical component is surface-mounted on a surface of a printed circuit board.

18. The electrical component of claim 17, wherein the electrical component is surface-mounted on the surface of the printed circuit board by solder.

19. The electrical component of claim 17, wherein outer portions of contact springs comprise contact pads mounted on an outer side of a bottom of a housing for electrically contacting the contact springs and thus the electrical resistor with the printed circuit board and for mechanically fixing the contact springs and thus the housing to the printed circuit board.

20. The electrical component of claim 19, wherein the contact pads form a flat surface together with the bottom of the housing and all contact pads are arranged coplanar.

21. The electrical component of claim 17, wherein the dimension of the resistor in a height direction perpendicular to the printed circuit board is smaller than or equal to 11 mm.

22. The electrical component of claim 17, wherein dimension of the electrical component in a height direction perpendicular to the printed circuit board is smaller than or equal to 14 mm.

23. The electrical component of claim 1, wherein the PTC ceramic comprises a specific ceramic composition with the formula $Ba_{(1-x-y-z)}Pb_xCa_ySr_zTiO_3$, and wherein $0.1<x<0.3$, $0<y<0.1$ and $0<z<0.1$ are fulfilled.

24. An electrical circuit comprising:

the electrical component of claim 1.

25. The electrical circuit of claim 24, wherein the electrical circuit is an inrush current limiter.

26. The electrical circuit of claim 24, wherein the electrical circuit is a discharge resistor.

27. An electrical component comprising:

an electrical resistor comprising a PTC ceramic with a reference temperature exceeding 150° C., wherein, at the reference temperature, a reference resistance is twice an amount of a minimum resistance of the PTC ceramic;

a housing comprising a cover and enclosing the electrical resistor; and contact springs permanently incorporated in the housing and comprising at least an inner portion inside the housing in a cavity and an outer portion outside the housing, wherein the inner portions of the contact springs, which are located on the resistor are barb shaped, wherein a central, curved part of a barb shaped portion of each contact spring is arranged on the resistor, wherein an inner terminus of each spring is arranged on an inner wall of the cover of the housing, wherein the barb shaped portions of the contact springs on opposite sides of the resistor are clamped between the resistor and the cover, and wherein the cover provides a hard force to keep the housing closed and to fix the resistor.

28. The electrical component of claim 27, wherein the housing has a cuboid shape.

29. The electrical component of claim 27, wherein the housing comprises a thermo-resistant plastic material.

* * * * *